US011937044B2

(12) United States Patent

Ioku et al.

(10) Patent No.: US 11,937,044 B2

(45) Date of Patent: Mar. 19, 2024

(54) SOUND EMISSION CONTROL DEVICE

(71) Applicant: Yamaha Corporation, Shizuoka (JP)

(72) Inventors: Kenta Ioku, Shizuoka (JP); Masumi Adachi, Shizuoka (JP)

(73) Assignee: YAMAHA CORPORATION, Shizuoka (JP)

(*) Notice: Subject to any disclaimer, the term of this patent is extended or adjusted under 35 U.S.C. 154(b) by 147 days.

(21) Appl. No.: 17/698,818

(22) Filed: Mar. 18, 2022

(65) Prior Publication Data

US 2022/0303672 A1 Sep. 22, 2022

(30) Foreign Application Priority Data

Mar. 19, 2021 (JP) .................................. 2021-45688

(51) Int. Cl.

*H04R 1/30* (2006.01)
*H04R 1/02* (2006.01)
*H04R 1/34* (2006.01)

(52) U.S. Cl.

CPC ............... *H04R 1/30* (2013.01); *H04R 1/345* (2013.01); *H04R 1/025* (2013.01)

(58) Field of Classification Search

CPC ........... H04R 1/30; H04R 1/345; H04R 1/025
USPC ........................................................ 381/340
See application file for complete search history.

(56) References Cited

U.S. PATENT DOCUMENTS

2013/0058518 A1* 3/2013 Held ........................ G10K 9/00 381/386

FOREIGN PATENT DOCUMENTS

JP H05-73695 U 10/1993

* cited by examiner

Primary Examiner — Sean H Nguyen
(74) *Attorney, Agent, or Firm* — Global IP Counselors, LLP

(57) ABSTRACT

A sound emission control device comprises a plurality of guides. The guides each include an inlet connected to a branching portion that is configured to oppose a vibrating surface inside an acoustic device, an outlet communicated to the inlet, and a horn-shaped inner wall surrounding a space between the inlet and the outlet. The guides are configured to guide sound that is emitted from the vibrating surface and branched by the branching portion to the outlets that are configured to be communicated to sound emission holes that are provided in the acoustic device and face mutually different directions, respectively.

10 Claims, 5 Drawing Sheets

SOUND EMISSION CONTROL DEVICE

CROSS-REFERENCE TO RELATED APPLICATIONS

This application claims priority to Japanese Patent Application No. 202145688, filed on Mar. 19, 2021. The entire disclosure of Japanese Patent Application No. 2021-45688 is hereby incorporated herein by reference.

BACKGROUND

Technical Field

The present invention relates to a sound emission control device that emits the sound generated by a sound source of an acoustic device in more than one direction.

Background Information

Acoustic devices that emit sound generated by a common sound source in more than one direction are known. For example, Japanese Unexamined Utility Model Application Publication No. H05-73695U (Patent Literature 1) discloses an electronic instrument comprising a diffuser that splits the sound emitted from a speaker into the front and rear sides of an electronic instrument.

SUMMARY

However, in the electronic instrument disclosed in Patent Document 1, the sound that is emitted from the speaker and split by the diffuser spreads over a wide range and propagates over a plurality of paths with different reflection points. Thus, there is the problem that when a listener moves his or her head, the frequency characteristics of the sound heard by the listener will change depending on the position of the head. Moreover, since the sound reaches the head of the listener over a plurality of paths with different reflection points, there is the problem of the occurrence of large dips in the peaks of the frequency characteristic of the sound heard by the listener.

In consideration of the circumstance described above, one object is to improve the sound quality of the sound provided by an acoustic device that emits sound in a plurality of directions.

The present disclosure provides a sound emission control device that comprises a plurality of guides. The guides each include an inlet connected to a branching portion that is configured to oppose a vibrating surface inside an acoustic device, an outlet communicated to the inlet, and a horn-shaped inner wall surrounding a space between the inlet and the outlet. The guides are configured to guide sound that is emitted from the vibrating surface and branched by the branching portion to the outlets that are configured to be communicated to sound emission holes that are provided in the acoustic device and face mutually different directions, respectively.

DETAILED DESCRIPTION OF EMBODIMENTS

Selected embodiments will now be explained in detail below, with reference to the drawings as appropriate. It will be apparent to those skilled from this disclosure that the following descriptions of the embodiments are provided for illustration only and not for the purpose of limiting the invention as defined by the appended claims and their equivalents.

Figure 1:
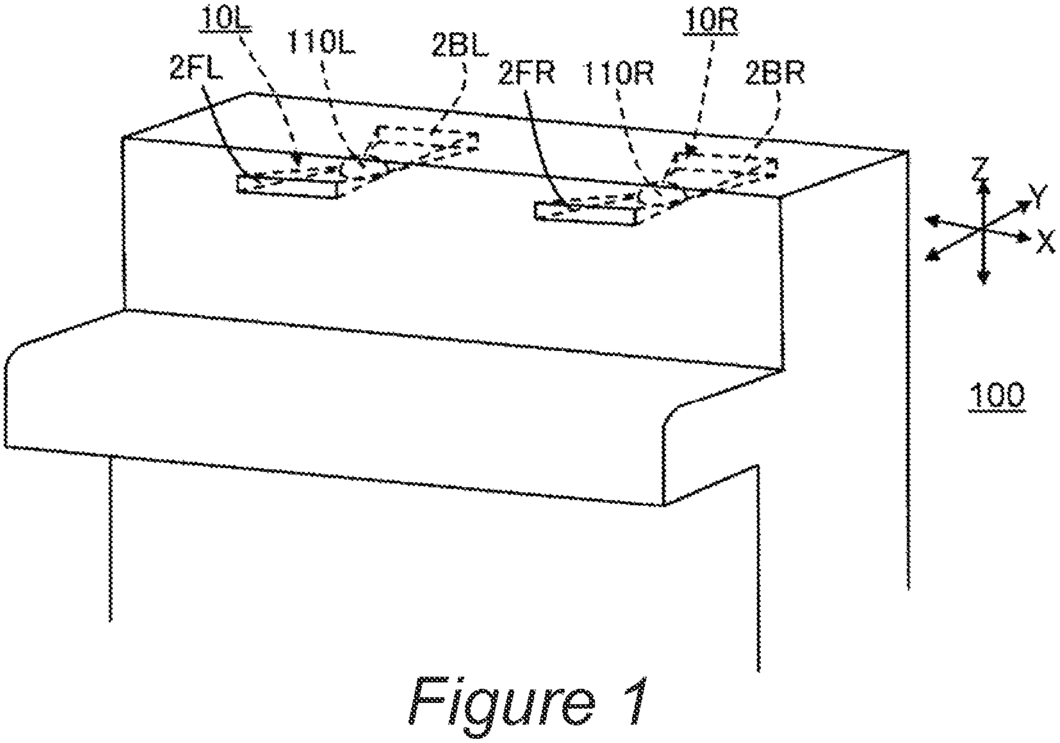
FIG. 1 shows a perspective view of the configuration of an electronic piano provided with a sound emission control device according to an embodiment of the present disclosure.

FIG. 1 shows a perspective view of the configuration of an electronic piano 100 provided with sound emission control devices 10L and 10R according to an embodiment of the present disclosure. In FIG. 1, two speakers 110L and 110R are arranged in the housing of the electronic piano 100 on the left and right sides thereof with the vibrating surface of each speaker disposed facing upwards and close to the top surface of the housing. The speakers 110L and 110R are high-frequency speakers that are driven by sound signals produced by the keyboard when played.

Two rectangular sound emission holes 2FL and 2FR on the left and right sides of the electronic piano 100 are provided in the upper front surface of the housing. In addition, two rectangular sound emission holes 2BL and 2BR on the left and right sides of the electronic piano 100 are provided the upper back surface of the housing.

Here, the left-right direction positions of the centers of the speaker 110L and the sound emission holes 2FL and 2BL are the same. The left-right direction positions of the centers of the speaker 110R and the sound emission holes 2FR and 2BR are also the same. In addition, the distance from the center of the speaker 110L to the center of the sound emission hole 2FL and the distance from the center of the speaker 110L to the center of the sound emission hole 2BL are the same. The distance from the center of the speaker 110R to the center of the sound emission hole 2FR and the distance from the center of the speaker 110R to the center of the sound emission hole 2BR are also the same.

In the present embodiment, the sound emission control device 10L, which branches sound that is emitted from the vibrating surface of the speaker 110L and guides the sound to both the sound emission hole 2FL side and the sound emission hole 2BL side, is provided in the housing of the electronic piano 100. The sound emission control device 10R, which branches sound that is emitted from the vibrating surface of the speaker 110R and guides the sound to both the sound emission hole 2FR side and the sound emission hole 2BR side, is also provided in the housing of the electronic piano 100. The configuration of each part of the electronic piano 100 will be described below, where the X-axis oriented in the left-right direction, the Y-axis is oriented in the front-rear direction, and the Z-axis is oriented in the vertical direction.

The sound emission control devices 10L and 10R have the same configuration. Thus, when it is not necessary to distinguish between the two, both are collectively referred to as sound emission control device 10. Similarly, when it is not necessary to distinguish between the speakers 110L and 110R, both are collectively referred to as speaker 110. Likewise, when it is not necessary to distinguish between the sound emission holes 2FL and 2FR, both are collectively referred to as sound emission hole 2F, and when it is not necessary to distinguish between the sound emission holes 2BL and 2BR, both are collectively referred to as sound emission hole 2B.

Figure 2:
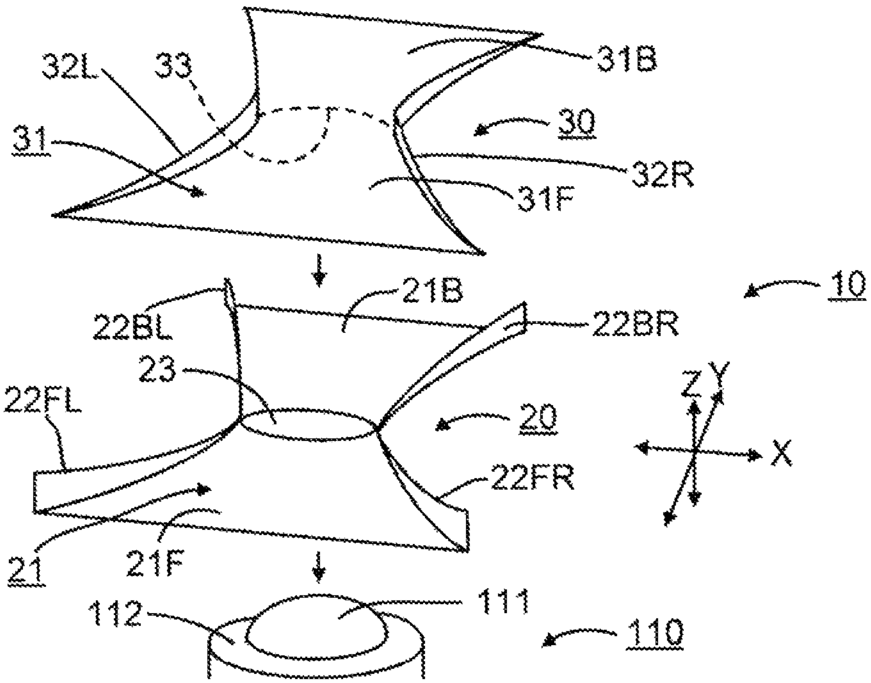
FIG. 2 is an assembly drawing of the sound emission control device.

FIG. 2 is an assembly drawing of the sound emission control device 10 disposed in the speaker 110. The sound emission control device 10 has a tray part 20 disposed on the speaker 110 and a lid part 30 disposed on the tray part 20.

The speaker 110 has hemispherical diaphragm 111 that vibrates in the Z-axis direction and a cylindrical magnetic circuit unit 112 provided with a magnetic gap (not shown in FIG. 2) that houses the annular peripheral portion of the diaphragm 111.

The tray part 20 includes a horizontal plate portion 21 and side wall portions 22FL, 22FR, 22BL, and 22BR. Here, the horizontal plate portion 21 has a planar shape, in which the upper bases of two isosceles trapezoidal plates, each having an upper base and a lower base that is longer than the upper base, are connected to each other. The side wall portions 22FL and 22FR respectively rise up from the left and right hypotenuses of an isosceles trapezoidal region 21F of the front half of the horizontal plate portion 21, and the side wall portions 22BL and 22BR respectively rise up from the left and right hypotenuses of an isosceles trapezoidal region 21B of the rear half of the horizontal plate portion 21. The side wall portions 22FL, 22FR, 22BL, and 22BR each have an essentially triangular shape, and the heights thereof increase from the center of the horizontal plate portion 21 toward the front or back of the housing of the electronic piano 100.

The central region of the horizontal plate portion 21, that is, the region in which the upper bases of the above-described two isosceles trapezoids are connected to each other, is provided with a through-hole 23 that receives the hemispherical diaphragm 111 that is exposed through the magnetic circuit unit 112. The tray part 20 is situated on the upper surface of the magnetic circuit unit 112 and held in a horizontal orientation in a state in which the diaphragm 111 is inserted through the through-hole 23.

The lid part 30 has a bottom wall portion 31, which is similar to the horizontal plate portion 21 and which is composed of a front-side isosceles trapezoidal region 31F and a rear-side isosceles trapezoidal region 31B, a side wall portion 32L that rises from two hypotenuses on the left side of the bottom wall portion 31, and a side wall portion 32R that rises from two hypotenuses on the right side of the bottom wall portion 31. Here, in the hypotenuse portions on the left and right sides of the lower surface of the bottom wall portion 31, the distance from the horizontal plate portion 21 of the tray part 20 increases from the center toward the front side and the rear side, so as to rest on the upper end surfaces of the side wall portions 22FL, 22FR, 22BL, and 22BR of the tray part 20 without gaps.

The boundary between the isosceles trapezoidal region 31F and the isosceles trapezoidal region 31B on the lower surface of the bottom wall portion 31 is an upwardly receding edge-shaped semicircular branching portion 33. Over its entire length, the apex of the edge of the semicircular branching portion 33 is in the plane that includes the X- and Z-axes passing through the center of the diaphragm 111 and opposes the vibrating surface of the hemispherical diaphragm 111 at essentially equal intervals.

When the bottom wall portion 31 is cut by the plane that includes X- and Z-axes and that moves along the Y-axis, the cross-sectional shape of the lower end portion of the bottom wall portion 31 is semicircular at the position of the branching portion 33 on the Y-axis, which gradually changes to a linear shape from the front side to the rear side of the electronic piano 100 along the Y-axis. Then, at the front surface and rear surface positions of the electronic piano 100, the cross-sectional shape of the lower end portion of the bottom wall portion 31 becomes linear.

Figure 3:
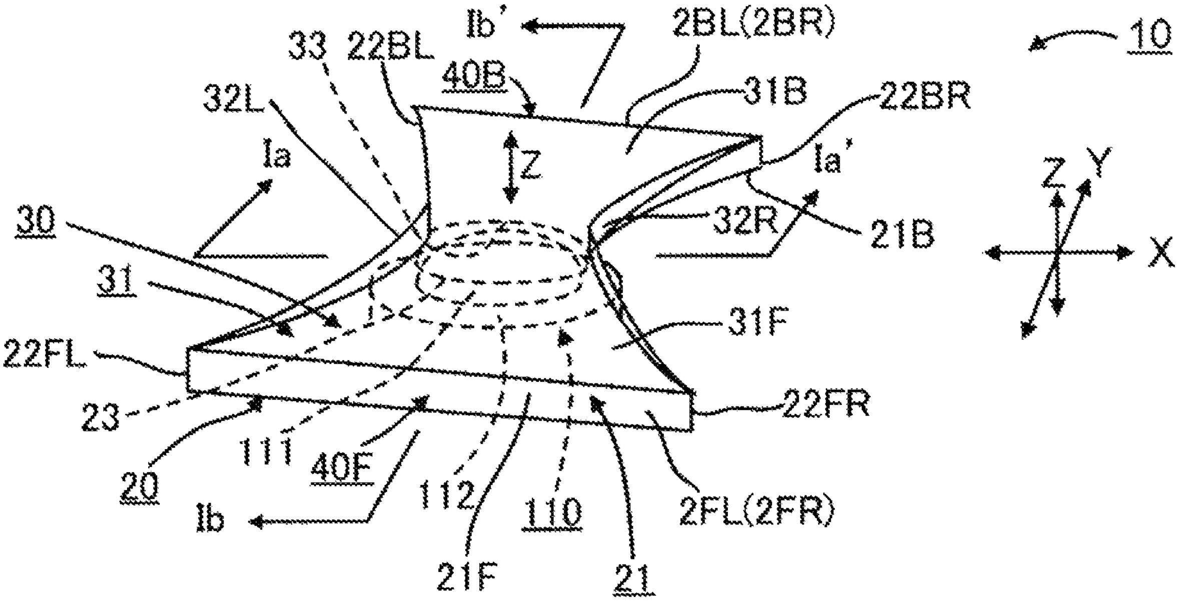
FIG. 3 shows a perspective view of the sound emission control device.
Figure 4:
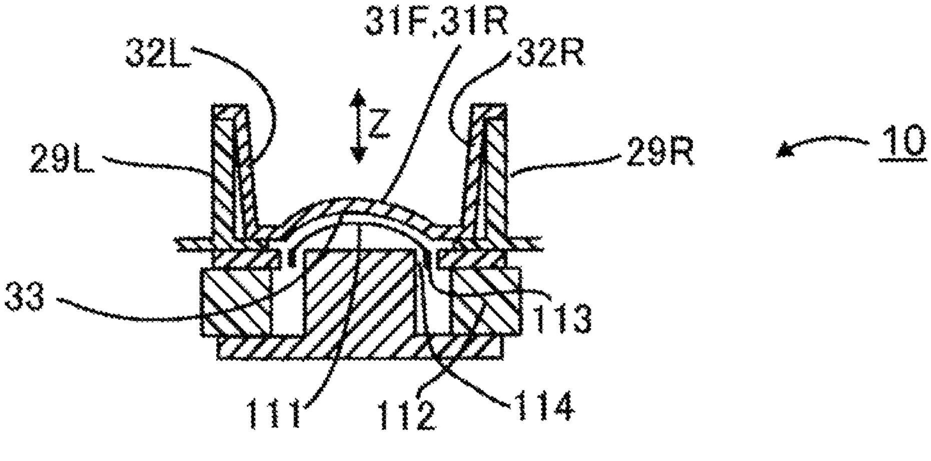
FIG. 4 shows a cross section through line Ia-Ia' in FIG. 3.
Figure 5:
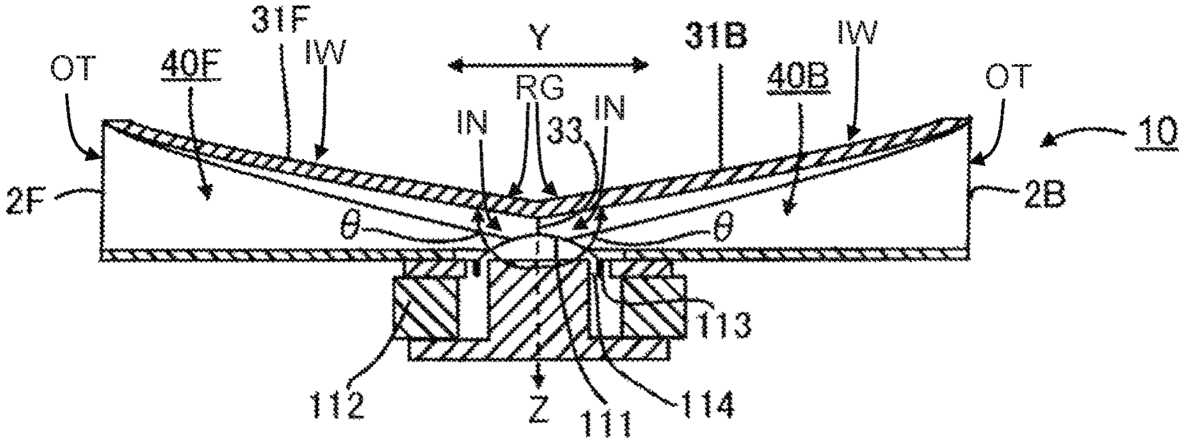
FIG. 5 shows a cross section through line Ib-Ib' in FIG. 3.

FIG. 3 is a perspective view showing the configuration of the sound emission control device 10. FIG. 4 shows a cross section through line Ia-Ia' in FIG. 3, that is, a cross-sectional view in which the sound emission control device 10 is cut by the plane that includes the Z-axis that passes through the center of the diaphragm 111 in the vertical direction and the X-axis that passes through the center of the diaphragm 111 in the left-right direction of the electronic piano 100. Further, FIG. 5 shows a cross section through line Ib-Ib' in FIG. 3, that is, a cross-sectional view in which the sound emission control device 10 is cut by the plane that includes a Z-axis that passes through the center of the diaphragm 111 in the vertical direction and the Y-axis that passes through the center of the diaphragm 111 in the front-rear direction of the electronic piano 100.

In FIG. 3, the isosceles trapezoidal region 21F on the front side of the horizontal plate portion 21 of the tray part 20, the side wall portions 22FL and 22FR, and the isosceles trapezoidal region 31F on the front side of the bottom wall portion 31 of the lid part 30 constitute a guide 40F that guides the sound that is emitted from the vibrating surface of the diaphragm 111 and branched by the branching portion 33 to the sound emission hole 2F on the front side of the electronic piano 100.

In addition, the isosceles trapezoidal region 21B on the rear side of the horizontal plate portion 21 of the tray part 20, the side wall portions 22BL and 22BR, and the isosceles trapezoidal region 31B on the rear side of the bottom wall portion 31 of the lid part 30 constitute a guide 40B that guides the sound that is emitted from the vibrating surface of the diaphragm 111 and branched by the branching portion 33 to the sound emission hole 2B on the rear side of the electronic piano 100.

The guides 40F and 40B are two guides that include two inlets IN, each connected to a branching portion 33 that opposes the diaphragm 111 (e.g., the vibrating surface of the diaphragm 111), two outlets OT communicated to or forming the sound emission holes 2FL (2FR) and 2BL (2BR) that are provided in the electronic piano 100 and face mutually different directions, respectively, and horn-shaped inner walls IW that surround the space between each inlet IN and outlet OT. The guides 40F and 40B guide the sound that is emitted from the diaphragm 111 (e.g., the vibrating surface of the diaphragm 111) and branched by the branching portion 33 to the two outlets OT. The outlets OT are communicated to the inlets IN. The guides 40F and 40B are of the same shape and size. Thus, in the present embodiment, the sound that is branched by the branching portion 33 enters the guides 40F and 40B at the same sound pressure, and is guided at the same sound pressure.

The guides 40F and 40B are horn-shaped guides in which the cross-sectional area of the opening continuously expands from the diaphragm 111 side toward the sound emission holes 2F and 2B sides. In other words, the guides 40F and 40B each have a hollow cross section whose opening area increases as moving away from the vibrating surface of the diaphragm 111. The shapes of inner wall surfaces of the inner walls IW of the guides 40F and 40B change continuously from inlet IN to outlet OT. Further details follow.

In the present embodiment, the guide 40F has two essentially triangular side surfaces (the side wall portions 22FL and 22FR) having two sides that separate from each other from the inlet IN to the outlet OT, and two essentially trapezoidal bottom surfaces (the isosceles trapezoidal region 21F of the horizontal plate portion 21 and the isosceles trapezoidal region 31F of the bottom wall portion 31) whose widths expand from the inlet IN to the outlet OT. The cross-sectional area of the opening of this guide 40F increases from the diaphragm 111 side toward the sound emission hole 2F side. The same applies to the guide 40B, which has an essentially triangular side surface and an essentially trapezoidal bottom surface, and the cross-sectional area of the opening increases from the diaphragm 111 side toward the sound emission hole 2B side. Thus, in the illustrated embodiment, the inner wall IW of the guide 40F includes two bottom walls (i.e., the isosceles trapezoidal region 21F of the horizontal plate portion 21 and the isosceles trapezoidal region 31F of the bottom wall portion 31) each having an essentially trapezoidal shape whose width increases as moving from the inlet IN to the outlet OT, and two side walls (i.e., the side wall portions 22FL and 22FR) each having an essentially triangular shape whose two sides separate from each other as moving from the inlet IN to the outlet OT. Also, the inner wall IW of the guide 40B includes two bottom walls (i.e., the isosceles trapezoidal region 21B of the horizontal plate portion 21 and the isosceles trapezoidal region 31B of the bottom wall portion 31) each having an essentially trapezoidal shape whose width increases as moving from the inlet IN to the outlet OT, and two side walls (i.e., the side wall portions 22BL and 22BR) each having an essentially triangular shape whose two sides separate from each other as moving from the inlet IN to the outlet OT.

As shown in FIGS. 4 and 5, a voice coil 113 is wound around the circumferential region of the diaphragm 111, and the voice coil 113 is accommodated in a magnetic gap 114 of the magnetic circuit unit 112. Energization of the voice coil 113 vibrates the diaphragm 111 in the direction of the drive axis Z that passes vertically through the center of the diaphragm 111. The vibrating surface of the diaphragm 111 thereby emits sound. In FIG. 4, the side wall portions 29L and 29R are elements of the tray part 20 that support the side wall portions 32L and 32R, and are not shown in the drawings other than in FIG. 4.

In the bottom wall portion 31, the plane that includes the drive axis Z and that is orthogonal to the front-rear axis Y acts as the boundary between the isosceles trapezoidal region 31F of the guide 40F and the isosceles trapezoidal region 31B of the guide 40B. The branching portion 33 is in the plane that includes the drive axis Z and that is orthogonal to the front-rear axis Y. The length of the branching portion 33 is essentially the same as the diameter of the diaphragm 111.

In this manner, in the present embodiment, the guides 40F and 40B, which are plurality of guides, each have the inlet IN connected to the branching portion 33 opposing the vibrating surface of the diaphragm 111. The guides 40F and 40B then guide the sound that is emitted from the vibrating surface of the diaphragm 111 and branched by the branching portion 33 in different directions. More specifically, the guides 40F and 40B guide the sound in a plurality of mutually different directions that are orthogonal to the drive axis Z of the vibrating surface of the diaphragm 111, that is, in the directions of the sound emission holes 2F and 2B, which are mutually opposite directions.

In addition, with particular attention to the cross-sectional shapes (FIG. 5) of the guides 40F and 40B, formed by cutting the plane that includes the drive axis Z and the front-rear axis Y, it can be seen that in the isosceles trapezoidal region 31F and the isosceles trapezoidal region 31B of the bottom wall portion 31, the regions RG (e.g., inner wall regions) of the inner wall IW of the guides 40F and 40B that are connected to the branching portion 33, specifically, the isosceles trapezoidal region 31F and the isosceles trapezoidal region 31B of the bottom wall portion 31, form an obtuse angle θ with respect to the drive axis Z that extends downward from the branching portion 33.

The shapes of the inner wall surfaces of the guides 40F and 40B are described below. Since the shapes of the inner wall surfaces of the guides 40F and 40B are the same, only the shape of the inner wall surface of the guide 40F will be described.

The inner wall surface of the lower side of the guide 40F, that is, the upper surface of the horizontal plate portion 21 is horizontal over the entire area. Thus, at least part of the inner wall IW of the guide 40F contains a planar portion. In other words, the inner wall IW of the guide 40F at least partially include a planar portion.

The inner wall surface of the side of the guide 40F, that is, the inner wall surfaces of the side wall portions 22FL and 22FR, run vertically over the entire area. Further, the inner wall surfaces of the side wall portions 22FL and 22FR separate from each other, and the respective gradient with respect to the front-rear axis Y increases from the diaphragm 111 side toward the sound emission hole 2F side.

The inner wall surface of the upper side of the guide 40F, that is, the lower surface of the isosceles trapezoidal region 31F of the bottom wall portion 31, is separated from the inner wall surface of the lower side of the guide 40F from the diaphragm 111 side toward the sound emission hole 2F side. In addition, the lower surface of the isosceles trapezoidal region 31F of the bottom wall portion 31, cut by a plane orthogonal to the front-rear axis Y, has a semicircular shape at the position of the branching portion 33, but continuously changes from a semicircular to a linear shape toward the sound emission hole 2F side. Thus, in the illustrated embodiment, the inner wall IW of the guide 40F includes the lower surface of the isosceles trapezoidal region 31F of the bottom wall portion 31 (e.g., the inner wall surface) on the side opposing the vibrating surface of the diaphragm 111, and the lower surface of the isosceles trapezoidal region 31F of the bottom wall portion 31 has a cross section continuously changing from the semicircular shape to the linear shape as moving from the inlet IN to the outlet OT, as seen in FIGS. 2-5. Also, the inner wall IW of the guide 40B includes the lower surface of the isosceles trapezoidal region 31B of the bottom wall portion 31 (e.g., the inner wall surface) on the side opposing the vibrating surface of the diaphragm 111, and the lower surface of the isosceles trapezoidal region 31B of the bottom wall portion 31 has a cross section continuously changing from the semicircular shape to the linear shape as moving from the inlet IN to the outlet OT, as seen in FIGS. 2-5.

Figure 6:
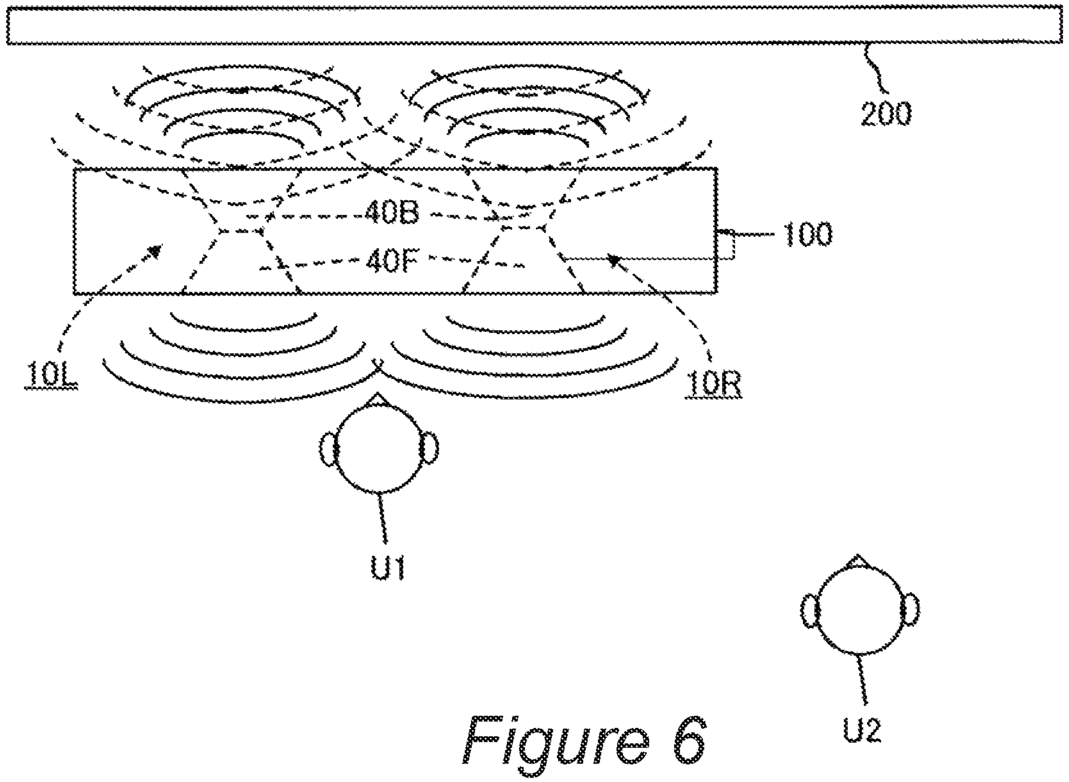
FIG. 6 a plan view for explaining the effects of the embodiment.

FIG. 6 is a plan view showing the electronic piano 100 arranged in front of a wall surface 200, and users U1 and U2 who are listening to sounds emitted from the electronic piano 100. The effects of the present embodiment will be described below with reference to FIG. 6.

The electronic piano 100 is played, and sound is emitted from the vibrating surfaces of the diaphragms 111 of the speakers 110L and 110R. Here, if the sound emission control devices 10L and 10R that include the guides 40F and 40B were not provided, and the sound emitted from the vibrating surfaces of the diaphragms 111 of the speakers 10L and 110R simply branched in two toward the front and rear sides to emit sound, the branched sound would spread and propagate over a wide area, so that the sound that has passed through a plurality of paths with different reflection points would reach the ears of users U1 and U2. For this reason, users U1 and U2 would hear sound with large dips in the peaks of the frequency characteristic.

However, the electronic piano 100 according to the present embodiment is provided with sound emission control devices 10L and 10R, which have the guides 40F and 40B. Thus, the sound emitted from the vibrating surface of the speaker 110L is branched toward the front and rear sides by the branching portion 33 of the sound emission control device 10L, guided by the guides 40F and 40B of the sound emission control device 10L, and emitted from the sound emission holes 2FL and 2BL. Further, the sound emitted from the vibrating surface of the speaker 110R is branched toward the front and rear sides by the branching portion 33 of the sound emission control device 10R, guided by the guides 40F and 40B of the sound emission control device 10R, and emitted from the sound emission holes 2FR and 2BR.

Here, in each of the guides 40F and 40B, the space from the inlet IN (or from the branching portion 33) to the outlet OT (or to the sound emission holes 2F and 2B) is surrounded by the horn-shaped inner wall surface that changes continuously from the inlet IN to the outlet OT. For this reason, the directivity of the sound that is guided to the outlet OT of each of the guides 40F and 40B does not change as a function of frequency in either the horizontal or vertical direction, so that the guides 40F and 40B function as constant directivity horns with which a uniform emission pattern can be obtained. Thus, the sound heard by the user U1 becomes a high-quality sound without large dips in the peaks of the frequency characteristic.

In addition, in the present embodiment, the two guides 40F that guide sound to the left and right sound emission holes 2FL and 2FR of the electronic piano 100 have the same shape and function as constant directivity horns with the same characteristics, and the user hears sound emitted from the sound emission holes 2FL and 2FR. Therefore, even if the user U1 were to move his or her head in the left-right direction, the user U1 would hear sound that has a uniform frequency characteristic over a wide area.

In addition, each of the sound emission control devices 10L and 10R of the present embodiment has the guides 40F and 40B for guiding sound in two mutually opposite directions. For this reason, as shown in FIG. 6, each sound emitted from the speakers 110L and 110R is guided to the sound emission holes 2FL and 2FR by the guide 40F of the sound emission control devices 10L and 10R, and also guided to the sound emission holes 2BL and 2BR on the rear side of the electronic piano 100 by the guide 40B of the sound emission control devices 10L and 10R, and reflected from the wall surface 200. Thus, user U1 and user U2 therebehind will hear sound that includes the sound reflected from the wall surface 200 and the sound from the sound emission holes 2FL and 2FR.

Here, with respect to the sound heard by user U1, the sound from the sound emission holes 2FL and 2FR is stronger than the sound reflected from the wall surface 200. Further, with respect to the sound heard by user U2, although the sound from the sound emission holes 2FL and 2FR is stronger than the sound reflected from the wall surface 200, user U2 tends to feel the sound reflected from the wall surface 200 more strongly than user U1. However, the sound reflected by the wall surface 200 produces a diffusing effect.

Therefore, the sound heard by user U1, who is the performer, has a spacious quality akin to sound emitted from an acoustic piano. On the other hand, due to the function of the sound emission control device 10 the sound that reaches user U2, who is behind and distant from user U1, is a high-frequency sound, which would be attenuated in a normal structure not provided by the sound emission control device 10, as well as the reflected sound that is diffused due to reflection at the wall surface. Therefore, the sound heard by user U2 is close to the sound made by a piano with an expanded sound image. Thus, by means of the present embodiment, it is possible to enhance the sound quality of the sound heard by the performer of the electronic piano 100 as well as the sound heard by a listener positioned away from the performer.

OTHER EMBODIMENTS

One embodiment of the present disclosure is described above, but other embodiments of the present disclosure are conceivable. Some examples follow.

(1) In the above-described embodiment, the sound emitted from the vibrating surface is branched in two, but three or more branchings can be used, and three or more guides having inlets that are each connected to this branched portion and that guide sound to three or more outlets oriented in mutually different directions may be provided.

(2) In the above-described embodiment, two sound emission control devices 10 are provided in the electronic piano 100, but the sound emission control device 10 may be used with an acoustic device other than the electronic piano 100, such as a loudspeaker. In addition, the number of the sound emission control devices 10 provided in an acoustic device is arbitrary.

(3) In the above-described embodiment, the bottom wall surfaces of the guides 40F and 40B have an isosceles trapezoidal shape, but it may be a trapezoidal shape in which the lengths of the two hypotenuses are different.

(4) In the above-described embodiment, the guides 40F and 40B guide sound in the front-rear direction of the electronic piano 100, but the guides may guide sound in a direction at an angle to the front-rear direction.

Figure 7:
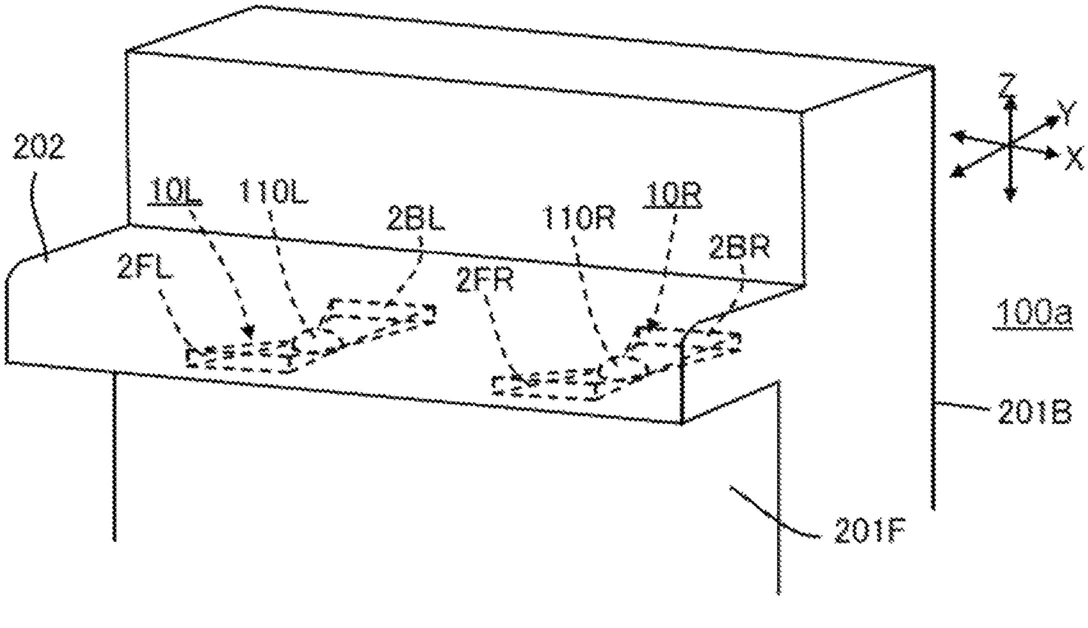
FIG. 7 shows a perspective view of the configuration of another electronic piano provided with the sound emission control device.

(5) FIG. 7 shows a perspective view of the configuration of another electronic piano 100*a* provided with the sound emission control devices of the above-described embodiment. In the electronic piano 100 in the above-described embodiment (FIG. 1), the left and right speakers 110L and 110R with the upward sound emission direction and the left and right sound emission control devices 10L and 10R are arranged in the housing and close to the top surface of the housing. On the other hand, in the electronic piano 100*a* shown in FIG. 7, the left and right speakers 110L and 110R with the upward sound emission direction and the left and right sound emission control devices 10L and 10R are arranged at positions below a musical keyboard 202 in the housing. Furthermore, in the electronic piano 100*a*, the sound emission holes 2FL and 2FR of the sound emission devices 10L and 10R are provided at positions below the musical keyboard 202 in a front surface 201F of the housing, while the sound emission holes 2BL and 2BR of the sound emission devices 10L and 10R are provided at positions below the musical keyboard 202 in a back surface 201B of the housing. In this form, the same effects as in the above-described embodiment can be obtained.

Figure 8:
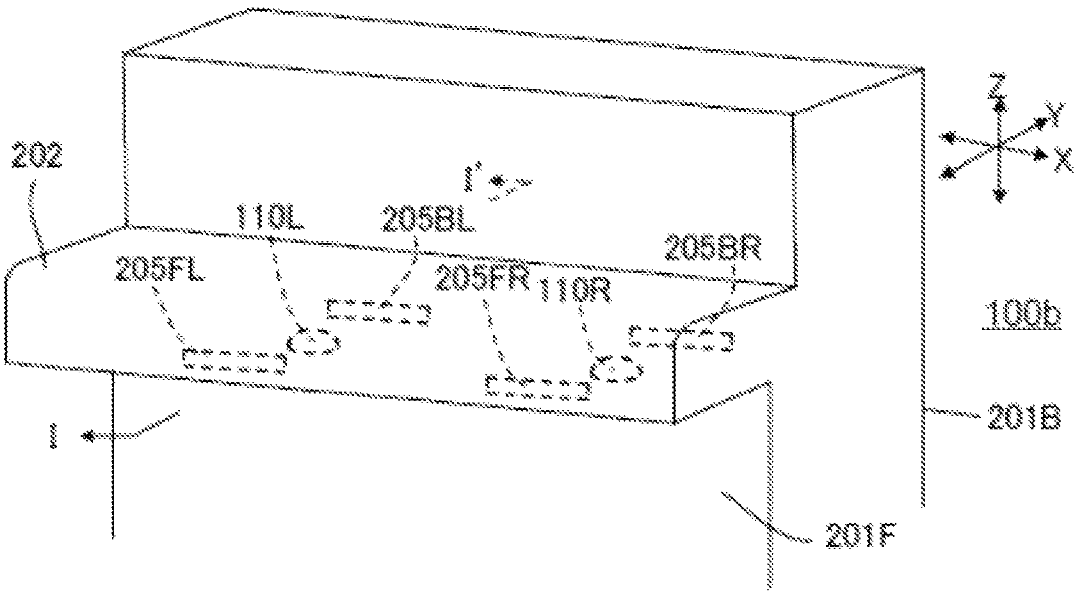
FIG. 8 shows a perspective view of another form of an electronic piano.
Figure 9:
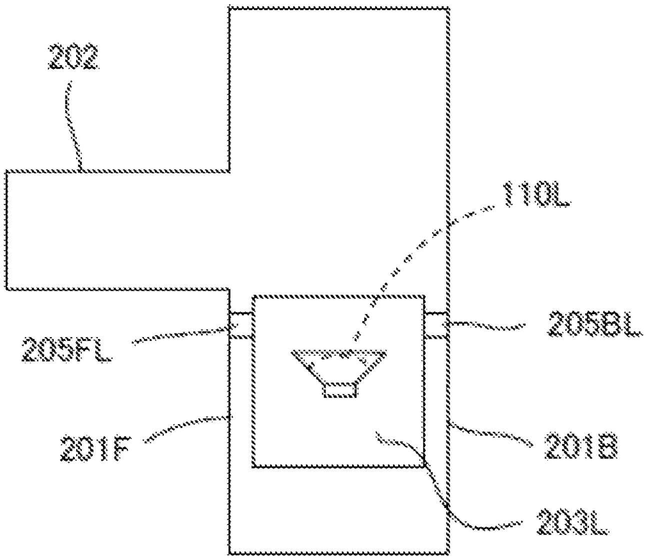
FIG. 9 shows a cross section through line I-I' in FIG. 8.

(6) FIG. 8 shows a perspective view of another form of an electronic piano. FIG. 9 shows a cross section through line I-I' in FIG. 8. In an electronic piano 100*b* shown in FIGS. 8 and 9, as in the electronic piano 100*a* shown in FIG. 7, the left and right speakers 110L and 110R with the upward sound emission direction are arranged at positions below the musical keyboard 202 in the housing. More specifically, two spaces for accommodating the left and right speakers 110L and 110R are provided below the musical keyboard 202 in the housing. FIG. 9 shows one space 203L of the two spaces. In this space 203L, the speaker 10L with the upward sound emission direction is supported. In the front surface 201F and the back surface 201B of the housing, sound emission holes 205FL and 205BL that connect the space 203L to the outside of the housing are provided at positions on the left side below the musical keyboard 202. Although not shown in the drawings, a space similar to the space 203L is also provided for the right speaker 110R. Furthermore, in the front surface 201F and the back surface 201B of the housing, sound emission holes 205FR and 205BR that connect the space in which this speaker 110R is accommodated to the outside of the housing are provided at positions on the right side below the musical keyboard 202. In this example, the two speakers 110L and 10R are accommodated in two separate spaces, but the two speakers 110L and 110 may be accommodated in a single space.

In this electronic piano 100*b*, the sound emitted upward from the left and right speakers 110L and 110R is branched toward the front surface 201F side and the back surface 201B side, and emitted from the sound emission holes 205FL and 205FR on the front side and from the sound emission holes 205BL and 205BR on the rear side, respectively. Here, when a listener is positioned at the front side of the electronic piano 100*b*, the sound emitted from the sound emission holes 205FL and 205FR on the front side reaches the listener directly, while the sound emitted from the sound emission holes 205BL and 205BR on the rear side reaches the listener after the reflection by the wall. Therefore, the sound heard by the listener can be given an audible sense of spaciousness.

What is claimed is:

1. A sound emission control device comprising:
a plurality of guides each including
an inlet connected to a branching portion that is configured to oppose a vibrating surface inside an acoustic device,
an outlet communicated to the inlet, and
a horn-shaped inner wall surrounding a space between the inlet and the outlet,
the guides being configured to guide sound that is emitted from the vibrating surface and branched by the branching portion to the outlets that are configured to be communicated to sound emission holes that are provided in the acoustic device and face mutually different directions, respectively,
the inner walls of the guides at least partially including a planar portion.

2. The sound emission control device according to claim 1, wherein
the guides are configured to guide the sound in a plurality of mutually different directions that are orthogonal to a driving direction of the vibrating surface, and
regions of the inner walls of the guides connected to the branching portion form an obtuse angle with respect to the driving direction.

3. The sound emission control device according to claim 2, wherein
the guides include two guides that guide the sound in mutually opposite directions.

4. The sound emission control device according to claim 2, wherein
the guides have a hollow cross section whose opening area increases as moving away from the vibrating surface.

5. The sound emission control device according to claim 4, wherein
the inner walls of the guides each include two bottom walls each having an essentially trapezoidal shape whose width increases as moving from the inlet to the outlet, and two side walls each having an essentially triangular shape whose two sides separate from each other as moving from the inlet to the outlet.

6. The sound emission control device according to claim 5, wherein
the vibrating surface is hemispherical, and
the inner walls of the guides each include an inner wall surface on a side opposing the vibrating surface, the inner wall surface having a cross section continuously changing from a semicircular shape to a linear shape as moving from the inlet to the outlet.

7. The sound emission control device according to claim 1, wherein
the guides include two guides that guide the sound in mutually opposite directions.

8. The sound emission control device according to claim 1, wherein
the guides have a hollow cross section whose opening area increases as moving away from the vibrating surface.

9. The sound emission control device according to claim 8, wherein
the inner walls of the guides each include two bottom walls each having an essentially trapezoidal shape whose width increases as moving from the inlet to the outlet, and two side walls each having an essentially triangular shape whose two sides separate from each other as moving from the inlet to the outlet.

10. The sound emission control device according to claim 9, wherein
the vibrating surface is hemispherical, and
the inner walls of the guides each include an inner wall surface on a side opposing the vibrating surface, the inner wall surface having a cross section continuously changing from a semicircular shape to a linear shape as moving from the inlet to the outlet.

* * * * *